United States Patent
Raad et al.

(10) Patent No.: US 9,522,699 B2
(45) Date of Patent: Dec. 20, 2016

(54) TRAILER BACKUP ASSIST SYSTEM WITH ADAPTIVE STEERING ANGLE LIMITS

(71) Applicant: Ford Global Technologies, LLC, Dearborn, MI (US)

(72) Inventors: Joseph M. Raad, Farmington, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/614,443

(22) Filed: Feb. 5, 2015

(65) Prior Publication Data
US 2016/0229451 A1    Aug. 11, 2016

(51) Int. Cl.
| | | |
|---|---|---|
| *B62D 13/00* | (2006.01) | |
| *B62D 13/06* | (2006.01) | |
| *B62D 6/00* | (2006.01) | |
| *B62D 15/02* | (2006.01) | |

(52) U.S. Cl.
CPC ............... *B62D 13/06* (2013.01); *B62D 6/002* (2013.01); *B62D 15/027* (2013.01)

(58) Field of Classification Search
None
See application file for complete search history.

(56) References Cited

U.S. PATENT DOCUMENTS

| | | |
|---|---|---|
| 3,542,390 A | 11/1970 | Fikes et al. |
| 3,605,088 A | 9/1971 | Savelli |
| 3,756,624 A | 9/1973 | Taylor |
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,499 A | 7/1989 | Martinet et al. |

(Continued)

FOREIGN PATENT DOCUMENTS

| | | |
|---|---|---|
| CN | 202159367 U | 3/2012 |
| CN | 102582686 B | 9/2013 |

(Continued)

OTHER PUBLICATIONS

"Ford Super Duty: Truck Technologies", Brochure, Sep. 2011, 2 pages.

(Continued)

*Primary Examiner* — Jonathan M Dager
(74) *Attorney, Agent, or Firm* — Raymond L. Coppiellie; Prices Heneveld LLP

(57) ABSTRACT

A trailer backup assist system includes a sensor that measures a hitch angle between a vehicle and a trailer. A steering system controls a steering angle of the vehicle between physical angle limits. A controller of the trailer backup assist system generates adaptive angle limits based on a maximum hitch angle rate and generates a steering command within the physical and adaptive angle limits for the vehicle to guide the trailer on a desired curvature.

20 Claims, 9 Drawing Sheets

(56) References Cited

U.S. PATENT DOCUMENTS

| | | | |
|---|---|---|---|
| 4,852,901 A | 8/1989 | Beasley et al. | |
| 4,943,080 A | 7/1990 | Reimer | |
| 5,001,639 A | 3/1991 | Breen | |
| 5,056,905 A | 10/1991 | Jensen | |
| 5,097,250 A | 3/1992 | Hernandez | |
| 5,108,123 A | 4/1992 | Rubenzik | |
| 5,108,158 A | 4/1992 | Breen | |
| 5,132,851 A | 7/1992 | Bomar et al. | |
| 5,152,544 A | 10/1992 | Dierker, Jr. et al. | |
| 5,191,328 A | 3/1993 | Nelson | |
| 5,244,226 A | 9/1993 | Bergh | |
| 5,246,242 A | 9/1993 | Penzotti | |
| 5,247,442 A * | 9/1993 | Kendall | B62D 13/06 280/426 |
| 5,282,641 A | 2/1994 | McLaughlin | |
| 5,289,892 A | 3/1994 | Notsu | |
| 5,290,057 A | 3/1994 | Pellerito | |
| 5,455,557 A | 10/1995 | Noll et al. | |
| 5,521,633 A | 5/1996 | Nakajima et al. | |
| 5,523,947 A | 6/1996 | Breen | |
| 5,541,778 A | 7/1996 | DeFlorio | |
| 5,558,350 A | 9/1996 | Kimbrough et al. | |
| 5,559,696 A | 9/1996 | Borenstein | |
| 5,579,228 A | 11/1996 | Kimbrough et al. | |
| 5,586,814 A | 12/1996 | Steiner | |
| 5,631,656 A | 5/1997 | Hartman et al. | |
| 5,650,764 A | 7/1997 | McCullough | |
| 5,690,347 A | 11/1997 | Juergens et al. | |
| 5,719,713 A | 2/1998 | Brown | |
| 5,747,683 A * | 5/1998 | Gerum | G05B 13/042 701/72 |
| 5,821,852 A | 10/1998 | Fairchild | |
| 5,980,048 A | 11/1999 | Rannells, Jr. et al. | |
| 6,041,582 A | 3/2000 | Tiede et al. | |
| 6,042,196 A | 3/2000 | Nakamura et al. | |
| 6,056,371 A | 5/2000 | Lin et al. | |
| 6,124,709 A | 9/2000 | Allwine | |
| 6,151,175 A | 11/2000 | Osha | |
| 6,198,992 B1 | 3/2001 | Winslow | |
| 6,217,177 B1 | 4/2001 | Rost | |
| 6,218,828 B1 | 4/2001 | Bates et al. | |
| 6,223,104 B1 | 4/2001 | Kamen et al. | |
| 6,223,114 B1 | 4/2001 | Boros et al. | |
| 6,268,800 B1 * | 7/2001 | Howard | B60D 1/305 340/431 |
| 6,292,094 B1 * | 9/2001 | Deng | B62D 7/159 340/431 |
| 6,351,698 B1 | 2/2002 | Kubota et al. | |
| 6,409,288 B2 | 6/2002 | Yoshida et al. | |
| 6,472,865 B1 | 10/2002 | Tola et al. | |
| 6,480,104 B1 | 11/2002 | Wall et al. | |
| 6,483,429 B1 | 11/2002 | Yasui et al. | |
| 6,494,476 B2 | 12/2002 | Masters et al. | |
| 6,498,977 B2 | 12/2002 | Wetzel et al. | |
| 6,539,288 B2 | 3/2003 | Ishida et al. | |
| 6,567,731 B2 | 5/2003 | Chandy | |
| 6,568,093 B2 | 5/2003 | Kogiso et al. | |
| 6,577,952 B2 | 6/2003 | Geier et al. | |
| 6,668,225 B2 | 12/2003 | Oh et al. | |
| 6,712,378 B1 | 3/2004 | Austin | |
| 6,801,125 B1 | 10/2004 | McGregor et al. | |
| 6,806,809 B2 | 10/2004 | Lee et al. | |
| 6,820,888 B1 | 11/2004 | Griffin | |
| 6,838,979 B2 | 1/2005 | Deng et al. | |
| 6,854,557 B1 * | 2/2005 | Deng | B62D 7/159 180/235 |
| 6,857,494 B2 | 2/2005 | Kobayashi et al. | |
| 6,879,240 B2 | 4/2005 | Kruse | |
| 6,956,468 B2 | 10/2005 | Lee et al. | |
| 6,959,970 B2 | 11/2005 | Tseng | |
| 6,999,856 B2 | 2/2006 | Lee et al. | |
| 7,005,974 B2 | 2/2006 | McMahon et al. | |
| 7,008,088 B2 | 3/2006 | Pisciotti | |
| 7,028,804 B2 | 4/2006 | Eki et al. | |
| 7,032,705 B2 | 4/2006 | Zheng et al. | |
| 7,046,127 B2 | 5/2006 | Boddy | |
| 7,058,493 B2 | 6/2006 | Inagaki | |
| 7,089,101 B2 | 8/2006 | Fischer et al. | |
| 7,117,077 B2 | 10/2006 | Michi et al. | |
| 7,136,754 B2 | 11/2006 | Hahn et al. | |
| 7,139,650 B2 | 11/2006 | Lubischer | |
| 7,154,385 B2 | 12/2006 | Lee et al. | |
| 7,159,890 B2 | 1/2007 | Craig et al. | |
| 7,165,820 B2 | 1/2007 | Rudd, III | |
| 7,167,785 B2 | 1/2007 | Lohberg et al. | |
| 7,170,285 B2 | 1/2007 | Spratte | |
| 7,171,330 B2 | 1/2007 | Kruse et al. | |
| 7,204,504 B2 | 4/2007 | Gehring et al. | |
| 7,219,913 B2 | 5/2007 | Atley | |
| 7,225,891 B2 | 6/2007 | Gehring et al. | |
| 7,229,139 B2 | 6/2007 | Lu et al. | |
| 7,239,958 B2 | 7/2007 | Grougan et al. | |
| 7,269,489 B2 * | 9/2007 | Deng | B62D 13/00 180/418 |
| 7,272,481 B2 | 9/2007 | Einig et al. | |
| 7,295,907 B2 | 11/2007 | Lu et al. | |
| 7,319,927 B1 | 1/2008 | Sun et al. | |
| 7,401,871 B2 | 7/2008 | Lu et al. | |
| 7,405,557 B2 | 7/2008 | Spratte et al. | |
| 7,413,266 B2 | 8/2008 | Lenz et al. | |
| 7,425,889 B2 | 9/2008 | Widmann et al. | |
| 7,447,585 B2 | 11/2008 | Tandy, Jr. et al. | |
| 7,451,020 B2 | 11/2008 | Goetting et al. | |
| 7,463,137 B2 | 12/2008 | Wishart et al. | |
| 7,504,995 B2 | 3/2009 | Lawrence et al. | |
| 7,532,109 B2 | 5/2009 | Takahama et al. | |
| 7,540,523 B2 * | 6/2009 | Russell | B60D 1/30 280/430 |
| 7,548,155 B2 | 6/2009 | Schutt et al. | |
| 7,568,716 B2 | 8/2009 | Dietz | |
| 7,623,952 B2 | 11/2009 | Unruh et al. | |
| 7,648,153 B2 | 1/2010 | Metternich et al. | |
| 7,690,737 B2 | 4/2010 | Lu | |
| 7,715,953 B2 | 5/2010 | Shepard | |
| 7,731,302 B2 | 6/2010 | Tandy, Jr. et al. | |
| 7,793,965 B2 * | 9/2010 | Padula | B62D 13/025 280/426 |
| 7,798,263 B2 | 9/2010 | Tandy, Jr. et al. | |
| 7,878,545 B2 | 2/2011 | Rhymer et al. | |
| 7,904,222 B2 | 3/2011 | Lee et al. | |
| 7,905,507 B2 | 3/2011 | Perri | |
| 7,950,751 B2 | 5/2011 | Offerle et al. | |
| 7,953,536 B2 | 5/2011 | Katrak | |
| 7,969,326 B2 | 6/2011 | Sakakibara | |
| 7,974,444 B2 | 7/2011 | Hongo | |
| 8,010,252 B2 | 8/2011 | Getman et al. | |
| 8,010,253 B2 | 8/2011 | Lundquist | |
| 8,033,955 B2 | 10/2011 | Farnsworth | |
| 8,036,792 B2 * | 10/2011 | Dechamp | B62D 15/027 180/235 |
| 8,038,166 B1 | 10/2011 | Piesinger | |
| 8,044,779 B2 | 10/2011 | Hahn et al. | |
| 8,073,594 B2 | 12/2011 | Lee et al. | |
| 8,108,116 B2 | 1/2012 | Mori et al. | |
| 8,157,284 B1 | 4/2012 | McGhie et al. | |
| 8,165,770 B2 | 4/2012 | Getman et al. | |
| 8,167,444 B2 | 5/2012 | Lee et al. | |
| 8,170,726 B2 | 5/2012 | Chen et al. | |
| 8,174,576 B2 | 5/2012 | Akatsuka et al. | |
| 8,180,543 B2 | 5/2012 | Futamura et al. | |
| 8,190,364 B2 | 5/2012 | Rekow | |
| 8,191,915 B2 | 6/2012 | Freese, V et al. | |
| 8,192,036 B2 | 6/2012 | Lee et al. | |
| 8,215,436 B2 | 7/2012 | DeGrave et al. | |
| 8,223,204 B2 | 7/2012 | Hahn | |
| 8,244,442 B2 | 8/2012 | Craig et al. | |
| 8,260,518 B2 | 9/2012 | Englert | |
| 8,267,485 B2 | 9/2012 | Barlsen et al. | |
| 8,280,607 B2 | 10/2012 | Gatti et al. | |
| 8,308,182 B2 | 11/2012 | Ortmann et al. | |
| 8,326,504 B2 | 12/2012 | Wu et al. | |
| 8,342,560 B2 | 1/2013 | Albers et al. | |
| 8,374,749 B2 | 2/2013 | Tanaka | |

(56) References Cited

U.S. PATENT DOCUMENTS

| | | |
|---|---|---|
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,430,792 B2 | 4/2013 | Noll |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,571,758 B2 | 10/2013 | Klier et al. |
| 8,576,115 B2 | 11/2013 | Basten |
| 8,626,382 B2 | 1/2014 | Obradovich |
| 8,675,953 B1 | 3/2014 | Elwell et al. |
| 8,755,982 B2 | 6/2014 | Heckel et al. |
| 8,755,984 B2 | 6/2014 | Rupp et al. |
| 8,807,261 B2 | 8/2014 | Subrt et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 * | 2/2015 | Fortin .................. B62D 13/00 280/442 |
| 9,008,913 B1 * | 4/2015 | Sears .................. B62D 13/00 172/264 |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 * | 9/2015 | Chiu .................. B60D 1/62 |
| 9,180,890 B2 | 11/2015 | Lu et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 2001/0024333 A1 | 9/2001 | Rost |
| 2001/0037164 A1 | 11/2001 | Hecker |
| 2001/0052434 A1 | 12/2001 | Ehrlich et al. |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 * | 7/2004 | Lee .................. B60D 1/58 340/431 |
| 2004/0215374 A1 * | 10/2004 | Shepard .................. B60D 1/58 701/1 |
| 2004/0222881 A1 * | 11/2004 | Deng .................. B62D 15/028 340/431 |
| 2005/0000738 A1 | 1/2005 | Gehring et al. |
| 2005/0055138 A1 * | 3/2005 | Lee .................. G05D 1/0891 701/1 |
| 2005/0128059 A1 | 6/2005 | Vause |
| 2005/0206224 A1 * | 9/2005 | Lu .................. B60T 7/12 303/7 |
| 2005/0206225 A1 * | 9/2005 | Offerle .................. B60T 8/1706 303/7 |
| 2005/0206229 A1 * | 9/2005 | Lu .................. B60T 7/20 303/123 |
| 2005/0206231 A1 * | 9/2005 | Lu .................. B60G 17/0162 303/146 |
| 2005/0209763 A1 * | 9/2005 | Offerle .................. B60T 8/1755 701/83 |
| 2005/0236201 A1 | 10/2005 | Spannheimer et al. |
| 2005/0236894 A1 * | 10/2005 | Lu .................. B60T 8/1755 303/139 |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 * | 5/2006 | Lee .................. B62D 5/008 340/431 |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 * | 11/2006 | Raab .................. B60T 8/1708 340/438 |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0198190 A1 | 8/2007 | Bauer et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0177443 A1 | 7/2008 | Lee et al. |
| 2008/0231701 A1 * | 9/2008 | Greenwood .................. B60R 1/00 348/148 |
| 2008/0312792 A1 | 12/2008 | Dechamp |
| 2009/0005932 A1 * | 1/2009 | Lee .................. B60D 1/58 701/41 |
| 2009/0079828 A1 | 3/2009 | Lee et al. |
| 2009/0082935 A1 | 3/2009 | Leschuk et al. |
| 2009/0085775 A1 | 4/2009 | Otsuka et al. |
| 2009/0093928 A1 | 4/2009 | Getman et al. |
| 2009/0157260 A1 | 6/2009 | Lee |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0271078 A1 | 10/2009 | Dickinson |
| 2009/0300701 A1 | 12/2009 | Karaoguz et al. |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0063702 A1 | 3/2010 | Sabelstrom et al. |
| 2010/0152989 A1 | 6/2010 | Smith et al. |
| 2010/0171828 A1 | 7/2010 | Ishii |
| 2010/0211248 A1 * | 8/2010 | Craig .................. B60W 30/02 701/31.4 |
| 2010/0211278 A1 * | 8/2010 | Craig .................. B60T 8/1708 701/70 |
| 2010/0332049 A1 | 12/2010 | Sy et al. |
| 2011/0001825 A1 | 1/2011 | Hahn |
| 2011/0018231 A1 * | 1/2011 | Collenberg .................. B60D 1/06 280/448 |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 * | 7/2012 | Headley .................. B60D 1/245 701/41 |
| 2012/0200706 A1 | 8/2012 | Greenwood et al. |
| 2012/0271512 A1 * | 10/2012 | Rupp .................. B62D 13/06 701/41 |
| 2012/0271514 A1 * | 10/2012 | Lavoie .................. B60W 30/18036 701/42 |
| 2012/0271515 A1 * | 10/2012 | Rhode .................. B62D 1/22 701/42 |
| 2012/0271522 A1 * | 10/2012 | Rupp .................. B62D 15/027 701/70 |
| 2012/0283909 A1 | 11/2012 | Dix |
| 2012/0283910 A1 | 11/2012 | Lee et al. |
| 2012/0310594 A1 | 12/2012 | Watanabe |
| 2012/0316732 A1 | 12/2012 | Auer |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0148748 A1 | 6/2013 | Suda |
| 2013/0158863 A1 * | 6/2013 | Skvarce .................. G08G 1/168 701/428 |

(56) References Cited

U.S. PATENT DOCUMENTS

| | | | |
|---|---|---|---|
| 2013/0179038 A1* | 7/2013 | Goswami | B62D 13/005 701/42 |
| 2013/0207834 A1 | 8/2013 | Mizutani et al. | |
| 2013/0226390 A1 | 8/2013 | Luo et al. | |
| 2013/0250114 A1 | 9/2013 | Lu | |
| 2013/0261843 A1 | 10/2013 | Kossira et al. | |
| 2013/0268160 A1* | 10/2013 | Trombley | B62D 13/06 701/42 |
| 2014/0005918 A1 | 1/2014 | Qiang | |
| 2014/0012465 A1* | 1/2014 | Shank | B60D 1/58 701/36 |
| 2014/0025260 A1 | 1/2014 | McClure | |
| 2014/0052337 A1* | 2/2014 | Lavoie | B62D 13/06 701/41 |
| 2014/0058614 A1* | 2/2014 | Trombley | B60R 1/00 701/29.1 |
| 2014/0058622 A1* | 2/2014 | Trombley | B60R 1/00 701/33.2 |
| 2014/0058655 A1 | 2/2014 | Trombley et al. | |
| 2014/0058668 A1* | 2/2014 | Trombley | G01C 21/20 701/523 |
| 2014/0067154 A1 | 3/2014 | Yu et al. | |
| 2014/0067155 A1 | 3/2014 | Yu et al. | |
| 2014/0085472 A1* | 3/2014 | Lu | B60R 1/002 348/148 |
| 2014/0088824 A1 | 3/2014 | Ishimoto | |
| 2014/0121930 A1 | 5/2014 | Allexi et al. | |
| 2014/0160276 A1* | 6/2014 | Pliefke | B60R 1/00 348/118 |
| 2014/0172232 A1* | 6/2014 | Rupp | B60W 30/18036 701/36 |
| 2014/0183841 A1 | 7/2014 | Jones | |
| 2014/0188344 A1 | 7/2014 | Lavoie | |
| 2014/0188346 A1* | 7/2014 | Lavoie | B62D 13/06 701/42 |
| 2014/0200759 A1* | 7/2014 | Lu | B60D 1/245 701/28 |
| 2014/0210456 A1* | 7/2014 | Crossman | B62D 13/06 324/207.2 |
| 2014/0218506 A1* | 8/2014 | Trombley | B60R 1/003 348/113 |
| 2014/0218522 A1* | 8/2014 | Lavoie | G08G 1/0962 348/148 |
| 2014/0222288 A1* | 8/2014 | Lavoie | G06F 17/00 701/41 |
| 2014/0236532 A1 | 8/2014 | Trombley et al. | |
| 2014/0249691 A1* | 9/2014 | Hafner | B62D 13/06 701/1 |
| 2014/0267688 A1* | 9/2014 | Aich | H04N 7/181 348/113 |
| 2014/0267689 A1* | 9/2014 | Lavoie | H04N 7/183 348/113 |
| 2014/0267868 A1 | 9/2014 | Mazzola et al. | |
| 2014/0267869 A1 | 9/2014 | Sawa | |
| 2014/0277941 A1* | 9/2014 | Chiu | B62D 13/06 701/41 |
| 2014/0277942 A1* | 9/2014 | Kyrtsos | G01B 21/02 701/41 |
| 2014/0297128 A1* | 10/2014 | Lavoie | G01B 21/06 701/41 |
| 2014/0297129 A1 | 10/2014 | Lavoie et al. | |
| 2014/0303847 A1* | 10/2014 | Lavoie | B62D 15/0275 701/41 |
| 2014/0309888 A1* | 10/2014 | Smit | B62D 13/06 701/41 |
| 2014/0324295 A1* | 10/2014 | Lavoie | B62D 13/06 701/41 |
| 2014/0343793 A1* | 11/2014 | Lavoie | B62D 13/06 701/41 |
| 2014/0343795 A1* | 11/2014 | Lavoie | B62D 13/06 701/42 |
| 2014/0358417 A1* | 12/2014 | Lavoie | G01C 21/165 701/300 |
| 2014/0358424 A1* | 12/2014 | Lavoie | G01C 21/3676 701/428 |
| 2014/0358429 A1* | 12/2014 | Shutko | G01C 21/3647 701/458 |
| 2014/0379217 A1* | 12/2014 | Rupp | B62D 13/06 701/41 |
| 2015/0002670 A1* | 1/2015 | Bajpai | G06K 9/00791 348/148 |
| 2015/0025732 A1 | 1/2015 | Min et al. | |
| 2015/0035256 A1 | 2/2015 | Klank et al. | |
| 2015/0057903 A1* | 2/2015 | Rhode | B60T 8/1708 701/70 |
| 2015/0066296 A1* | 3/2015 | Trombley | B62D 13/06 701/41 |
| 2015/0066298 A1 | 3/2015 | Sharma et al. | |
| 2015/0105975 A1 | 4/2015 | Dunn | |
| 2015/0115571 A1* | 4/2015 | Zhang | B60D 1/06 280/477 |
| 2015/0120141 A1* | 4/2015 | Lavoie | B62D 15/027 701/41 |
| 2015/0120143 A1* | 4/2015 | Schlichting | B62D 13/06 701/41 |
| 2015/0134183 A1* | 5/2015 | Lavoie | B60W 30/18036 701/23 |
| 2015/0138340 A1* | 5/2015 | Lavoie | B62D 13/06 348/118 |
| 2015/0149040 A1* | 5/2015 | Hueger | B62D 13/06 701/41 |
| 2015/0158527 A1* | 6/2015 | Hafner | B60D 1/245 701/41 |
| 2015/0165850 A1* | 6/2015 | Chiu | B60D 1/30 701/41 |
| 2015/0197278 A1* | 7/2015 | Boos | G05D 1/0044 701/2 |
| 2015/0203156 A1* | 7/2015 | Hafner | B62D 13/06 701/36 |
| 2015/0210254 A1* | 7/2015 | Pieronek | B60W 10/18 701/70 |
| 2015/0210317 A1* | 7/2015 | Hafner | B62D 13/06 701/41 |
| 2015/0217693 A1* | 8/2015 | Pliefke | B60R 1/00 348/118 |
| 2015/0269444 A1 | 9/2015 | Lameyre et al. | |
| 2016/0009288 A1 | 1/2016 | Yu | |
| 2016/0039456 A1* | 2/2016 | Lavoie | B62D 15/027 701/41 |
| 2016/0152263 A1 | 6/2016 | Singh et al. | |
| 2016/0153778 A1 | 6/2016 | Singh et al. | |
| 2016/0280267 A1* | 9/2016 | Lavoie | B62D 15/0285 |

FOREIGN PATENT DOCUMENTS

| | | |
|---|---|---|
| DE | 3923676 A1 | 1/1991 |
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |

(56) References Cited

FOREIGN PATENT DOCUMENTS

| | | |
|---|---|---|
| DE | 102008043675 A1 | 5/2010 |
| DE | 102009007990 A1 | 7/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| EP | 0418653 A1 | 3/1991 |
| EP | 0433858 A2 | 6/1991 |
| EP | 1361543 A2 | 11/2003 |
| EP | 1655191 A1 | 5/2006 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 10119739 A | 5/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166580 A | 9/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2013186208 A2 | 12/2013 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |

OTHER PUBLICATIONS

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.

M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.

F.W. Kienhöfer; D. Cebon, "An Investigation of ABS Strategies for Articulated Vehicles", Cambridge University, Engineering Department, United Kingdom, date unknown, 13 pages.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.

Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.

Zare, A. Sharafi; M. Kamyad, A.V., "A New Approach in Intelligent Trailer Parking", IEEE, 2010 2nd International Mechanical and Electrical Technology (ICMET), Sep. 2010, 1 page.

Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.

Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.

Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.

Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.

P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.

Dieter Zöbel, David Polock, Philipp Wojke, "Steering Assistance for Backing Up Articulated Vehicles", Systemics, Cybernetics and Informatics; vol. 1, No. 5, date unknown, 6 pages.

(56) References Cited

OTHER PUBLICATIONS

J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, Sage Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.
Novak, Domen; Dovzan, Dean; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.
Haviland, G S, "Automatic Brake Control for Trucks—What Good Is It?", TRID, Society of Automotive Engineers, Sep. 1968, 1 pg.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
Divelbiss, A.W.; Wen, J.T.; "Trajectory Tracking Control of a Car-Trailer System", IEEE, Control Systems Technology, Aug. 6, 2002, vol. 5, No. 3, 1 pg.
Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.
"Understanding Tractor-Trailer Performance", Caterpillar, 2006, pp. 1-28.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.
Olof Enqvist, "AFS-Assisted Trailer Reversing," Institutionen for systemteknik Deartment of Electrical Engineering, Jan. 27, 2006, 57 pgs.
Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.
Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.
"2012 Edge—Trailer Towing Selector", Brochure, Preliminary 2012 RV & Trailer Towing Guide Information, 2011, 3 pgs.
"Ford Super Duty: Truck Technologies", Brochure, Sep. 2011, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 1 pg.
Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.
"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.
Micah Steele, R. Brent Gillespie, "Shared Control Between Human and Machine: Using a Haptic Steering Wheel to Aid in Land Vehicle Guidance", University of Michigan, Date Unknown, 5 pgs.
SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

* cited by examiner

TRAILER BACKUP ASSIST SYSTEM WITH ADAPTIVE STEERING ANGLE LIMITS

FIELD OF THE INVENTION

The disclosure made herein relates generally to driver assist and active safety technologies in vehicles, and more particularly to a trailer backup assist system that is configured with adaptive steering angle limits generated based on the hitch angle rate to assist with autonomous vehicle guidance of the trailer.

BACKGROUND OF THE INVENTION

Reversing a vehicle while towing a trailer can be challenging for many drivers, particularly for drivers that drive with a trailer on an infrequent basis or with various types of trailers. One reason for such difficulty may be that backing a vehicle with an attached trailer requires steering inputs that are opposite to steering inputs when backing the vehicle without a trailer attached to the vehicle. Another reason for such difficulty may be that small errors in steering while backing a vehicle with an attached trailer are amplified, which may cause the trailer to quickly depart from a desired path. Yet an additional reason backing a trailer can prove to be difficult is the need to control the vehicle in a manner that limits the potential for a jackknife condition to occur. These difficulties may also be experienced and in some instances increased when attempting to quickly achieve a tight turning radius or when backing multiple trailers that may differently affect the reversing speed or the hitch angle articulation rate.

SUMMARY OF THE INVENTION

According to one aspect of the present invention, a trailer backup assist system includes a sensor that measures a hitch angle between a vehicle and a trailer. A steering system controls a steering angle of the vehicle between physical angle limits. A controller of the trailer backup assist system generates adaptive angle limits based on a maximum hitch angle rate and generates a steering command within the physical and adaptive angle limits for the vehicle to guide the trailer on a desired curvature.

According to another aspect of the present invention, a trailer backup assist system includes a hitch angle sensor that senses a hitch angle between a vehicle and a trailer. A speed sensor senses a speed of the vehicle. A steering system controls a steering angle of the vehicle. A controller of the trailer backup assist system generates an adaptive limit of the steering angle based on a maximum hitch angle rate, the speed, and the hitch angle.

According to yet another aspect of the present invention, a method includes sensing a hitch angle between a vehicle and a trailer and sensing a speed of the vehicle. The method also includes generating adaptive steering angle limits for the vehicle based on a maximum hitch angle rate, the speed, and the hitch angle. Further, the method includes controlling a steering angle of the vehicle within the steering angle limits to guide the trailer on a desired backing path.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
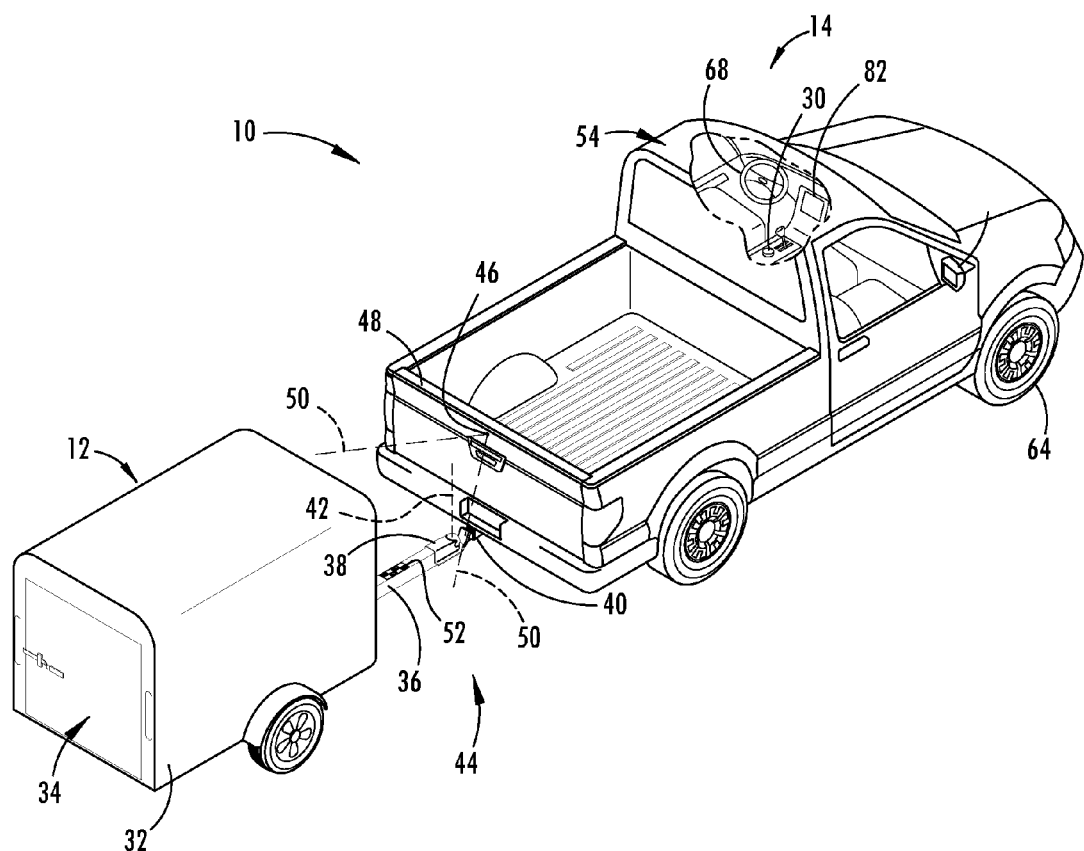
FIG. 1 is a top perspective view of a vehicle attached to a trailer with one embodiment of a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature 26 of the backing path as a driver uses the accelerator and brake pedals to control the reversing speed of the vehicle 14. To monitor the position of the trailer 12 relative to the vehicle 14, the trailer backup assist system 10 may include a sensor or sensor system 16 that senses or otherwise determines a hitch angle γ between the trailer 12 and the vehicle 14. In one embodiment, the sensor system 16 may include a hitch angle sensor 44, such as a vision-based sensor that employs a camera 46 on the vehicle 14 to monitor a target 52 on the trailer 12 to measure the hitch angle γ. The vehicle 14 is autonomously steered with a steering system 62 that controls a steering angle δ of the front wheels of the vehicle 14 within physical angle limits 20 of the steering system 62. A controller 28 of the trailer backup assist system 10 may also generate adaptive angle limits 23 for the steering system 62 based on a reversing speed of the vehicle 14, the hitch angle γ, and a maximum hitch angle rate. The maximum hitch angle rate may be preset or otherwise determined based on the rate at which the steering system 62 can accurately adjust the steering angle δ. Upon receiving a desired curvature 26, the controller 28 may generate a steering command within the physical and adaptive angle limits 20, 23 for the vehicle 14 to guide the trailer 12 on the desired curvature 26. The steering command for the vehicle 14 may be determined based on the estimated hitch angle γ and a kinematic relationship between the trailer 12 and the vehicle 14. As such, when the initially calculated steering command is outside the physical and adaptive angle limits 20, 23 of the steering system 62, the steering command may be restricted to the lesser of the physical angle limit 20 and the adaptive angle limit 23. Restricting the steering command to the adaptive angle limit 23 may prevent the steering system from exceeding the maximum hitch angle rate, and thereby avoid undesired hitch angle conditions outside the desired curvature 26, such as a jackknife condition.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a trailer yaw rate sensor, a proximity sensor, an ultrasonic sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

Figure 2:
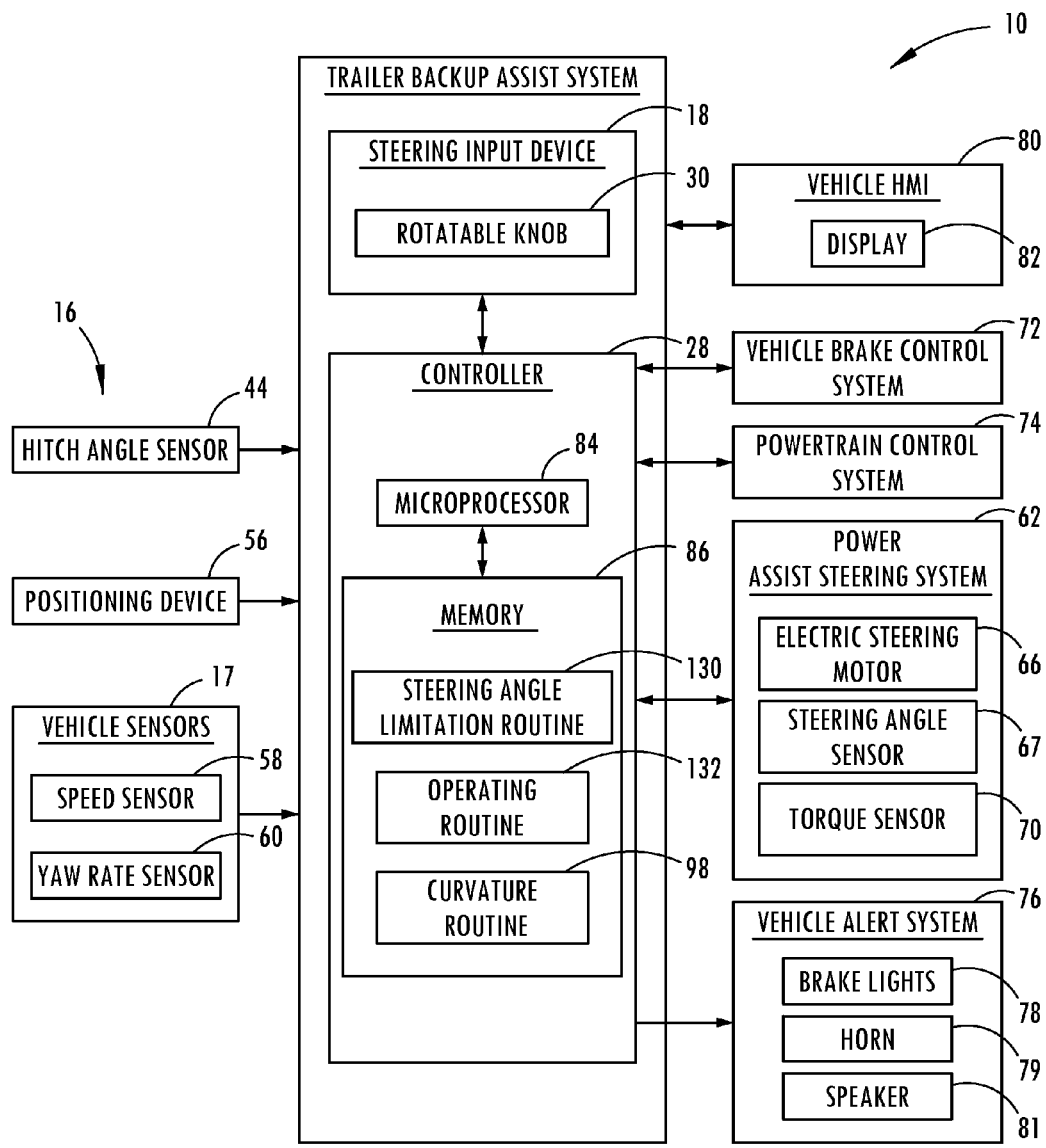
FIG. 2 is a block diagram illustrating one embodiment of the trailer backup assist system having a steering input device and a controller in communication with a steering system.

With reference to the embodiment of the trailer backup assist system 10 shown in FIG. 2, the hitch angle sensor 44 is illustrated generally as a means to estimate the hitch angle γ and communicate with the trailer backup assist system 10. The illustrated embodiment of the trailer backup assist system 10 also receives vehicle and trailer status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to supplement the hitch angle sensor 44 in estimating hitch angle γ or an indicator thereof, such as a range of hitch angles.

As also shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 generally reacts in accordance with the desired curvature 26 of the trailer 12. In the illustrated embodiment, the steering system 62 is an electric power-assisted steering (EPAS) system that includes an electric steering motor 66 for turning the steered wheels 64 (FIG. 1) to a steering angle based on a steering command, whereby the steering angle may be sensed by a steering angle sensor 67 of the steering system 62. Due to the size of wheel wells and tire dimensions, among other components of the vehicle 14, the steering system 62 may be physically constrained in the amount the steered wheels 64 may be freely turned by the electric steering motor 66, which thereby defines the physical steering angle limits 20 of the steering system 62. For instance, the physical steering angle limits 20 may be determined by the minimum turning radius achievable by the vehicle 14. Accordingly, the physical steering angle limits 20 may vary between types and configurations of different vehicles. In addition, the steering system 62 may also be naturally constrained by the maximum controllable steering angle rate of the steering system 62, which may be determined by the capacity of the electric steering motor 66, among other associated components of the steering system 62. The controllable rate of adjusting the steering angle δ with the steering system 62 may be used by the trailer backup assist system 10 to regulate the steering commands for preventing the resulting hitch angle conditions from deviating outside the desired curvature 26 of the trailer 12.

With further reference to FIG. 2, the steering command may be provided by the trailer backup assist system 10 for autonomously steering during a backup maneuver and may alternatively be provided by other vehicle steering assistance systems. It is also contemplated that a steering command may be provided manually via a rotational position (e.g., steering wheel angle) of a steering wheel 68 (FIG. 1) for manual operation of the vehicle. In the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In additional embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 may provide the controller 28 of the trailer backup assist system 10 with information relating to a rotational position of steered wheels 64 of the vehicle 14, such as the steering angle δ of the steered wheels 64. The controller 28 in the illustrated embodiment processes the current steering angle δ, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, in such an alternative embodiment the power assist steering system 62 may include an algorithm for generating vehicle steering information and commands as a function of all or a portion of information received from the steering input device 18, the hitch angle sensor 44, the power assist steering system 62, a vehicle brake control system 72, a powertrain control system 74, and the other vehicle sensors and devices.

As also illustrated in FIG. 2, the vehicle brake control system 72, also referred to as the braking system, may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For instance, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is also disclosed herein that the trailer backup assist system 10 can issue an alert signal corresponding to a notification of an actual, impending, and/or anticipated unacceptable trailer backup condition. Further, in one embodiment, the braking system 72 may be controlled with the trailer backup assist system 10 to autonomously limit speed of the vehicle 14 during a backing maneuver for the maximum hitch angle rate generated by the trailer backup assist system 10 to remain substantially constant, such that the vehicle 14 is limited to reversing at lower speeds as the hitch angle increases. The maximum hitch angle rate remaining substantially constant may also allow the adaptive steering angle limits 23 to not further restrict adjustments to the steering angle as the hitch angle increases.

The powertrain control system 74, as shown in the embodiment illustrated in FIG. 2, may similarly interact with the trailer backup assist system 10 for regulating speed and acceleration of the vehicle 14 during backing of the trailer 12. As mentioned above, regulation of the speed of the vehicle 14 may be used to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18, according to one embodiment, may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the hitch angle sensor 44, the steering input device 18, the steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a steering angle limitation routine 130, an operating routine 132, and a curvature routine 98. It should be appreciated that the controller 28 may be a stand-alone dedicated controller or may be a shared controller integrated with other control functions, such as integrated with the sensor system 16, the steering system 62, and other conceivable onboard or off-board vehicle control systems.

Figure 3:
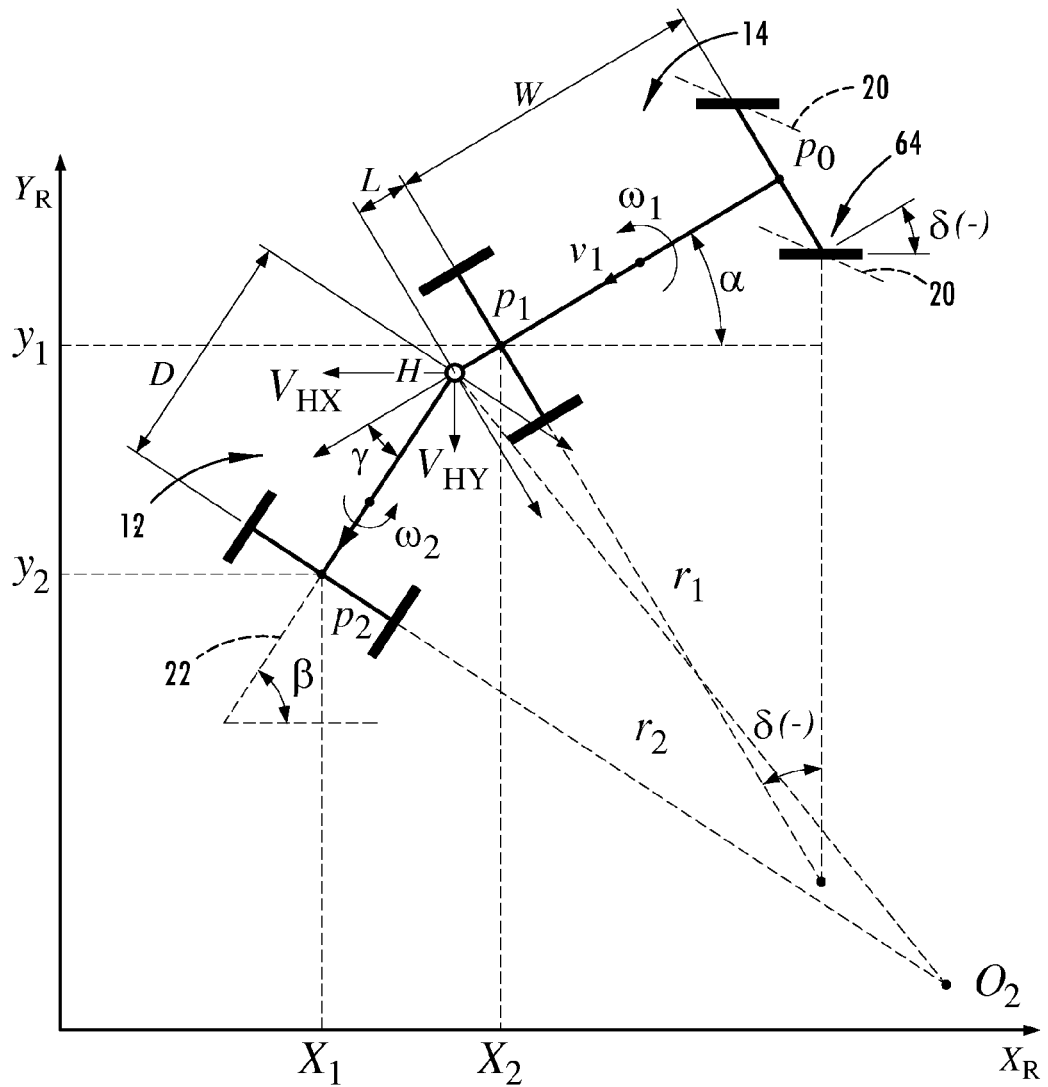
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12. The kinematic relationship can be usefully for various routines of a trailer backup assist system 10, including for use by a curvature routine 98 of the controller 28 in one embodiment. To determine such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;

γ: hitch angle (γ=β−α);
W: wheel base of the vehicle;
L: length between hitch point and rear axle of the vehicle;
D: distance between hitch point and axle of the trailer or effective axle for a multiple axle trailer (axle length may be an equivalent); and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{β}$ is trailer yaw rate and $\dot{η}$ is trailer velocity).

$$\kappa_2 = \frac{1}{r_2} = \frac{\dot{β}}{\dot{η}} = \frac{\left(W + \frac{KV^2}{g}\right)\sin γ + L\cos γ \tan δ}{D\left(\left(W + \frac{KV^2}{g}\right)\cos γ - L\sin γ \tan δ\right)}$$

This relationship can be expressed to provide the steering angle δ as a function of trailer path curvature $\kappa_2$ and hitch angle γ.

$$δ = \tan^{-1}\left(\frac{\left(W + \frac{KV^2}{g}\right)[\kappa_2 D \cos γ - \sin γ]}{DL\kappa_2 \sin γ + L\cos γ}\right) = F(γ, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption is that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned herein generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
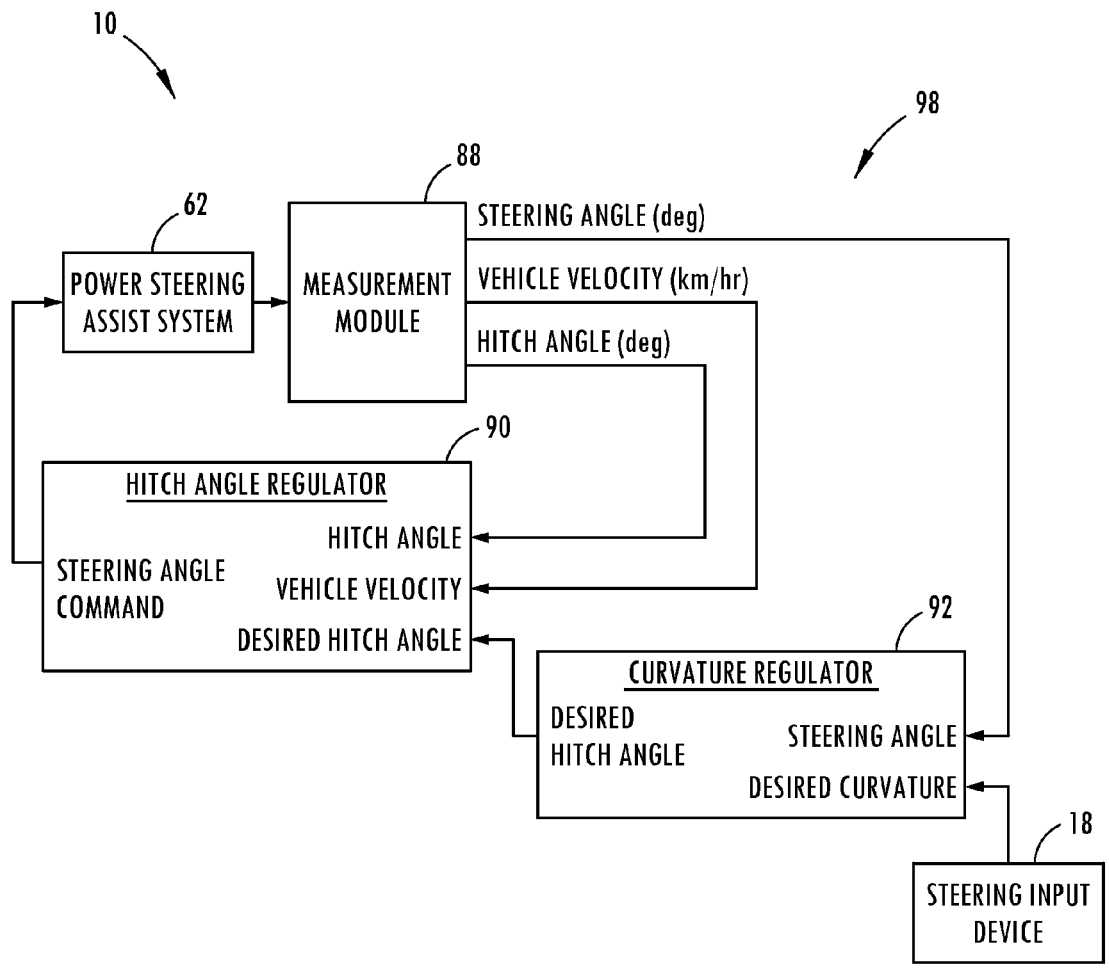
FIG. 4 is a schematic block diagram illustrating portions of a curvature routine of the controller, according to an additional embodiment, and other components of the trailer backup assist system, according to such an embodiment.

Yet another embodiment of the curvature routine 98 of the trailer backup assist system 10 is illustrated in FIG. 4, which depicts the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
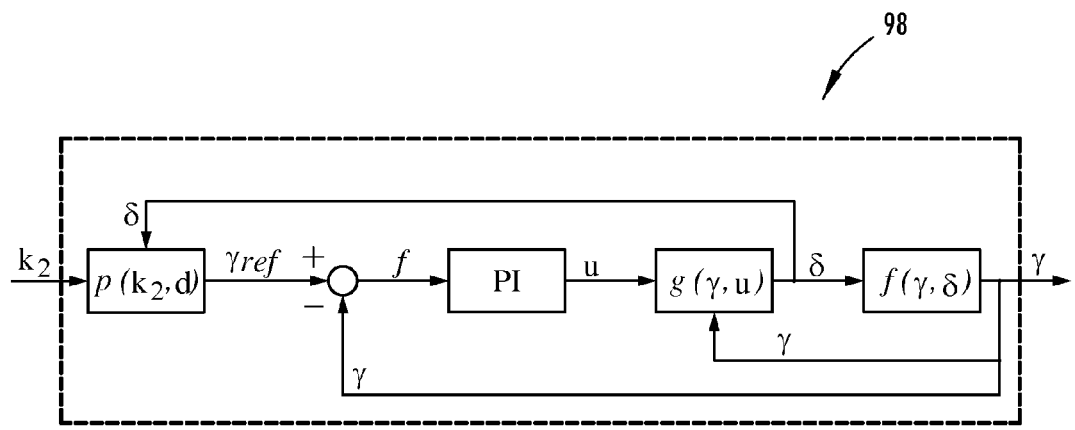
FIG. 5 is schematic block diagram of the curvature routine of FIG. 4, showing the feedback architecture and signal flow of the controller, according to such an embodiment.

As also shown in FIG. 5, the embodiment of the curvature routine 98 shown in FIG. 4 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, p($\kappa_2$, δ), which in one embodiment is the following equation:

$$p(\kappa_2, δ) = \tan^{-1}\left(\frac{\kappa_2 DW + L\tan(δ)}{\kappa_2 DL\tan(δ) - W}\right)$$

Where,
$\kappa_2$ represents the desired curvature of the trailer 12 or $1/r_2$ as shown in FIG. 3;
δ represents the steering angle;
L represents the distance from the rear axle of the vehicle 14 to the hitch pivot point;
D represents the distance from the hitch pivot point to the axle of the trailer 12; and W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(\frac{v}{D}\sin(\gamma) - u\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 5B may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Figure 6:
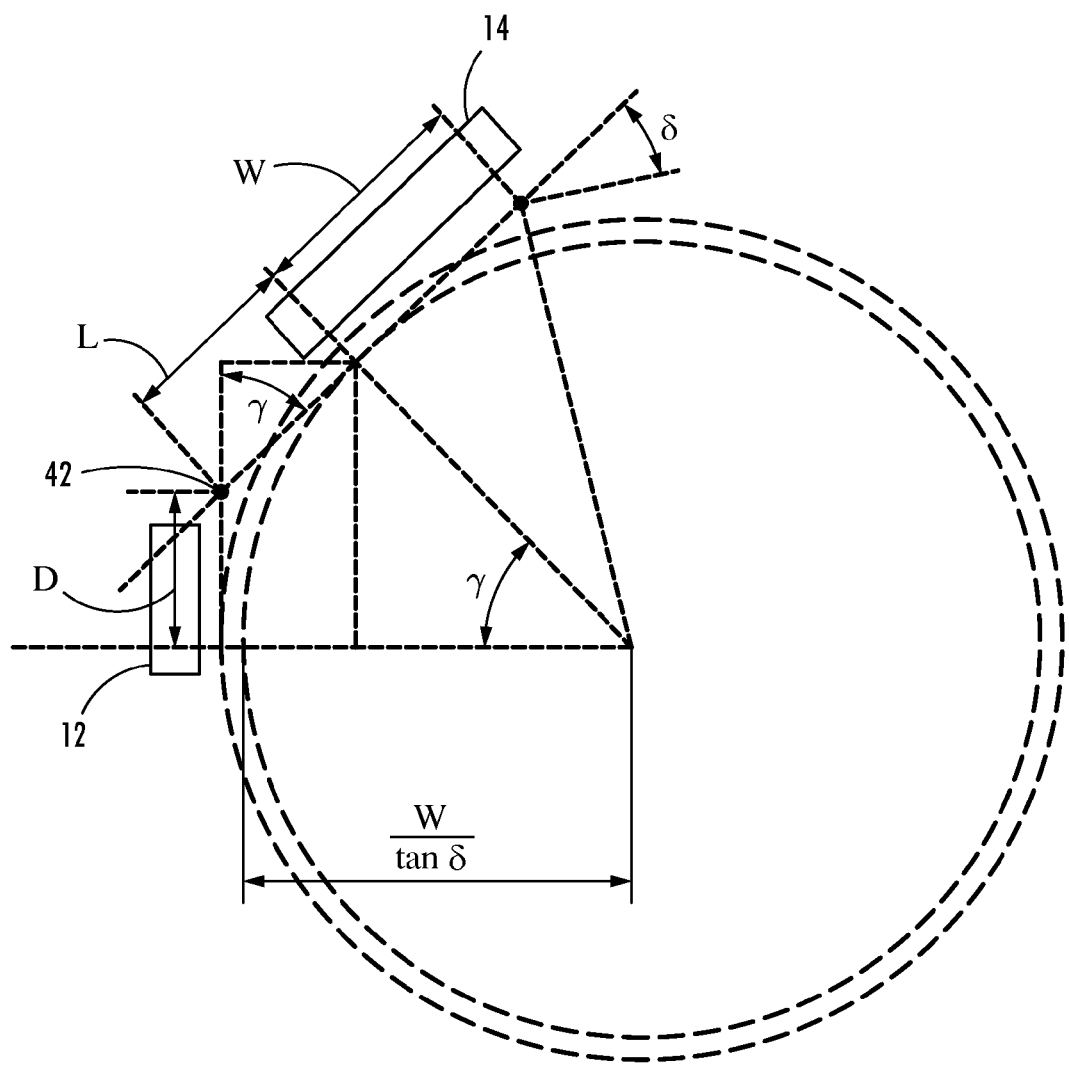
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it may be desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved a maximum rate of steering angle change to a maximum steered angle $\delta$ or physical steering angle limit 20. The jackknife angle $\gamma(j)$ is a function of a maximum wheel angle (i.e. a physical steering angle limit 20) for the steered wheels of the vehicle 14, the wheel base W of the vehicle 14, the distance L between hitch point and the rear axle of the vehicle 14, and the length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$.

A kinematic model representation of the vehicle 14 and the trailer 12 can also be used to determine a jackknife angle for the vehicle-trailer combination. Accordingly, with reference to FIGS. 3 and 6, the physical steering angle limit 20 for the steered front wheels 64 requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta(\max)$ or the physical steering angle limit 20. The steering angle for circular motion with hitch angle $\gamma$ is defined by the following equation.

$$\tan\delta_{max} = \frac{w\sin\gamma_{max}}{D + L\cos\gamma_{max}}$$

Solving the above equation for hitch angle $\gamma$ allows jackknife angle $\gamma(j)$ to be determined. This solution, which is shown in the following equation, can be used in implementing trailer backup assist functionality in accordance with the disclosed subject matter for monitoring hitch angle $\gamma$ in relation to jackknife angle.

$$\cos\bar{\gamma} = \frac{-b \pm \sqrt{b^2 - 4ac}}{2a}$$

where,
$a = L^2 \tan^2 \delta(\max) + W^2$;
$b = 2 LD \tan^2 \delta(\max)$; and
$c = D^2 \tan^2 \delta(\max) - W^2$.

In certain instances of backing the trailer 12, a jackknife enabling condition can arise based on current operating parameters of the vehicle 14 in combination with a corresponding hitch angle $\gamma$. This condition can be indicated when one or more specified vehicle operating thresholds are met while a particular hitch angle $\gamma$ is present. For example, although the particular hitch angle $\gamma$ is not currently at the jackknife angle for the vehicle 14 and attached trailer 12, certain vehicle operating parameters can lead to a rapid (e.g., uncontrolled) transition of the hitch angle $\gamma$ to the jackknife angle for a current commanded trailer curvature and/or can reduce an ability to steer the trailer 12 away from the jackknife angle.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle $\gamma$, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU), such as the controller 28, that carries out trailer backup assist functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the steered wheels 64 of the steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 7:
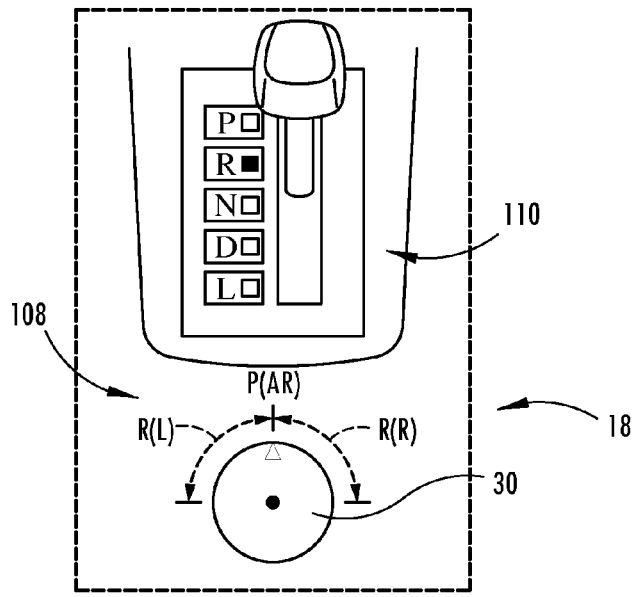
FIG. 7 is a plan view of one embodiment of a steering input device having a rotatable knob for operating the trailer backup assist system.

Referring now to FIG. 7, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 8:
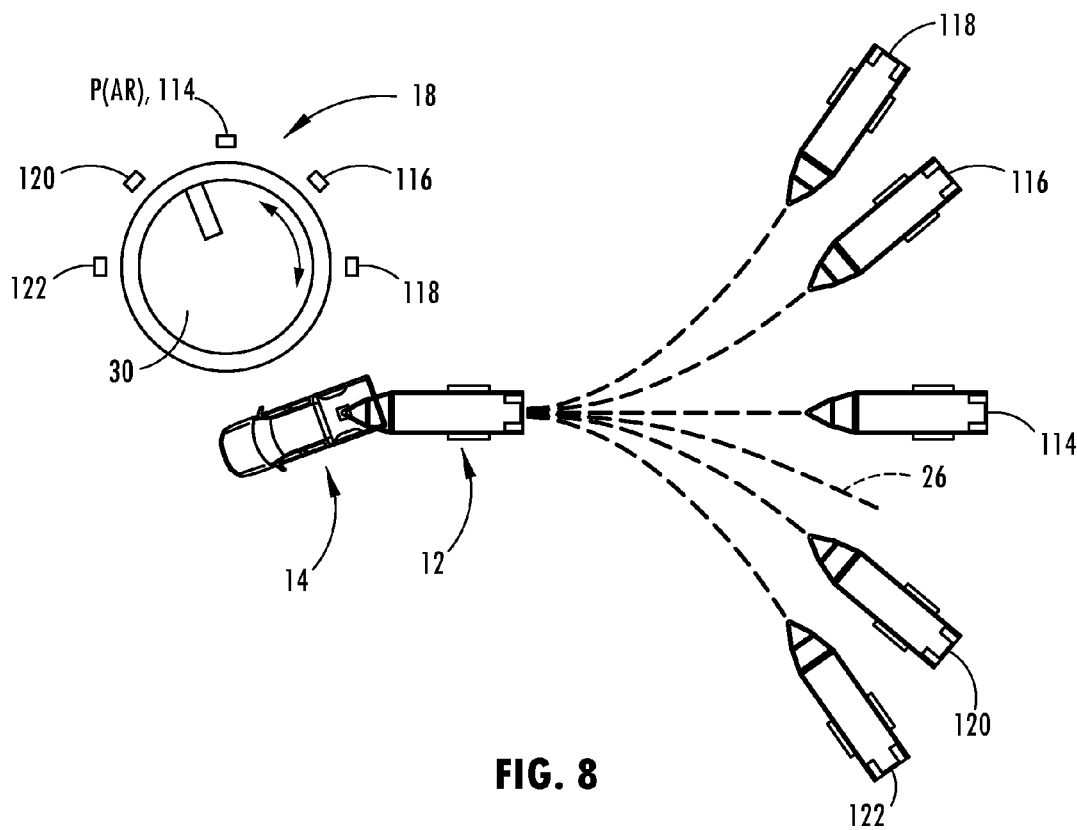
FIG. 8 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 7-8, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 8, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 9:
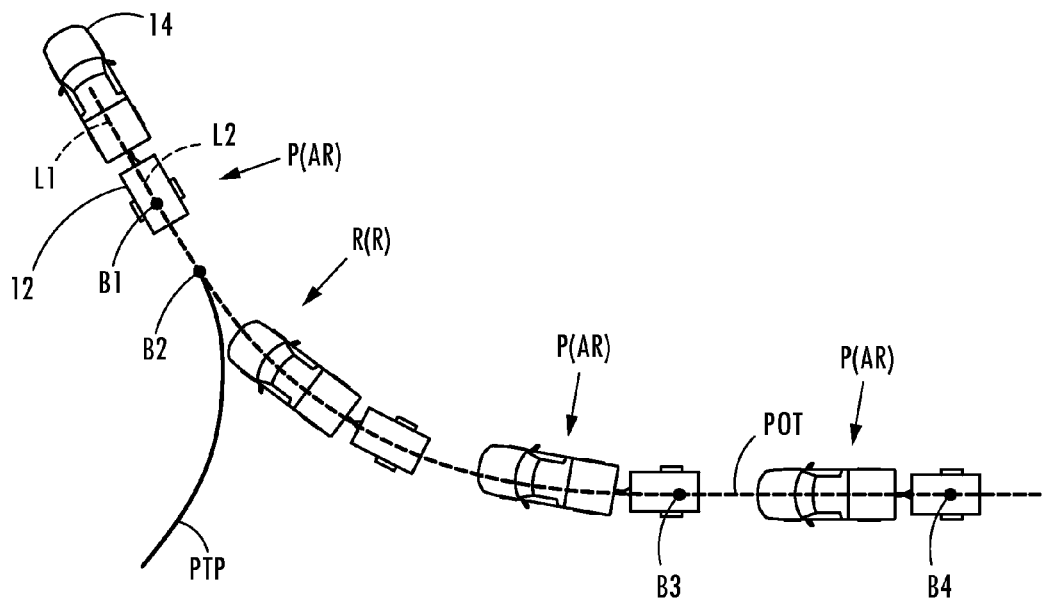
FIG. 9 is a schematic diagram showing a backup sequence of a vehicle and a trailer implementing various curvature selections with the trailer backup assist system, according to one embodiment.

Referring to FIG. 9, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 9, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the necessary steering command to achieve the desired curvature 26, whereby the driver controls the throttle and brake while the trailer backup assist system 10 controls the steering angle.

Figure 10:
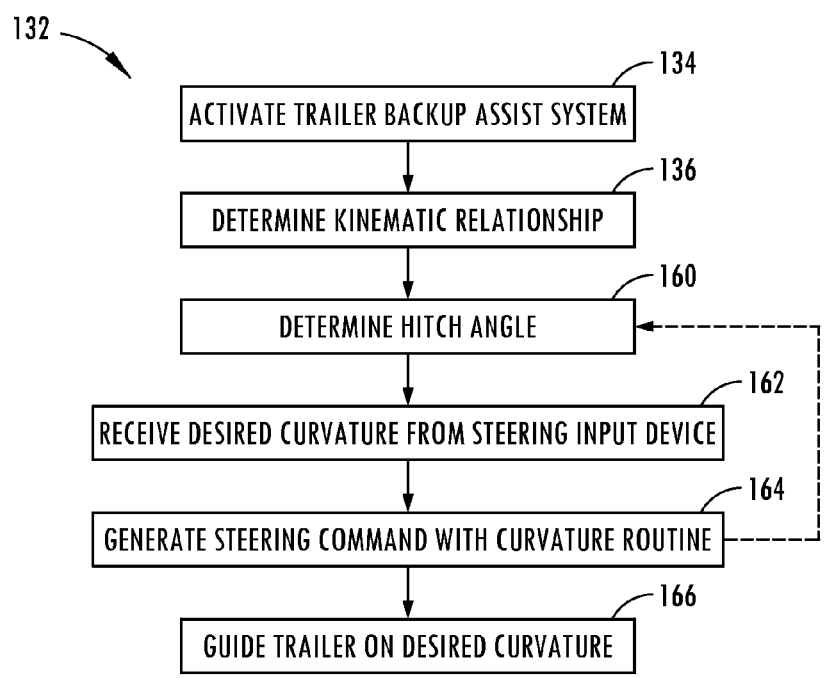
FIG. 10 is a flow diagram illustrating a method of operating a trailer backup assist system using an operating routine for steering a vehicle reversing a trailer with the desired curvature, according to one embodiment.

With reference to FIG. 10, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such a making a selection on the display 82 of the vehicle HMI 80. The next step 136 determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3 and 6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle with the hitch angle sensor 44. It is also conceivable that in some embodiments the hitch angle may be estimated additionally or alternatively with other devices, such as a sensor module having a yaw rate sensor attached to the trailer used in conjunction with a vehicle yaw rate sensor to calculate an estimate of the hitch angle. Further, it is contemplated that in additional embodiments of the trailer backup assist system 10 that the steps of determining the kinematic relationship and sensing the hitch angle γ may occur before the trailer backup assist system 10 is activated or at any other time before steering commands are generated.

Still referring to FIG. 10, at step 162, the position changes are received from the steering input device 18, such as the angular position of a secondary steering input device, such as the rotatable knob 30, for determining the desired curvature 26. With the determined desired curvature 26, at step 164, a steering command may be generated based on the desired curvature 26, correlating with the position of the steering input device 18. The steering commands generated may be generated in conjunction with the processing of the curvature routine 98 and the steering angle limitation routine 130, among other conceivable routines processed by the controller 28.

Figure 11:
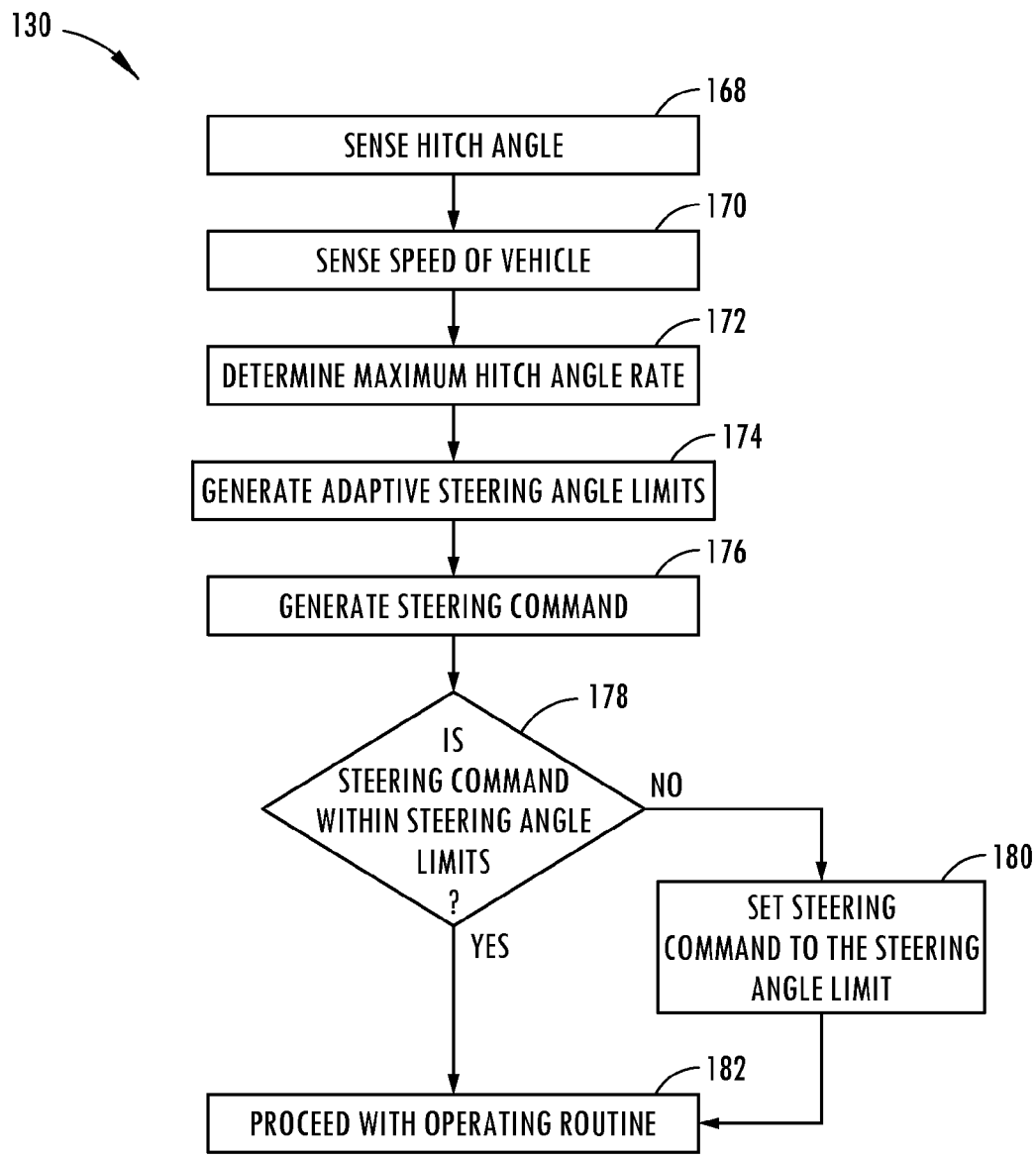
FIG. 11 is a flow diagram illustrating a method of operating a trailer backup assist system using a steering angle limitation routine, according to one embodiment.

With reference to FIG. 11, one embodiment of the steering angle limitation routine 130 is illustrated, which may be processed in parallel with the operating routine 132, although it is contemplated that the operating routine 132 may be modified in additional embodiments to incorporate the steps of the steering angle limitation routine 130, as described herein. The depicted embodiment includes the preliminary steps 168 and 170 of sensing the hitch angle γ and sensing the reversing speed of the vehicle, respectively. As mentioned above, the hitch angle γ may be previously determined at step 160 of the operating routine 132 and the speed of the vehicle 14 may be sensed with the speed sensor 58 on the vehicle, among other potential ways of the determining the hitch angle γ and the speed.

Still referring to FIG. 11, after the preliminary steps 168 and 170, the illustrated embodiment includes step 172 of determining the maximum hitch angle rate for the steering system. According to one embodiment, the maximum hitch angle rate may be preset based on a maximum controllable steering angle rate of the vehicle. As previously mentioned, the maximum controllable steering angle rate of the vehicle may be determined by the capabilities of the steering system 62 of the particular vehicle 14 and may be a default static value or may dynamically update based on operating conditions or other conceivable factors. In an additional embodiment, the maximum hitch angle rate may also be continuously regenerated and defined as a function of the speed of the vehicle 14. It is also contemplated that the maximum hitch angle rate may be additionally or alternatively determined with incorporating other variables, such as a length of the trailer 12. In additional embodiments, step 172 may be performed before the preliminary steps 168 and 170 or in conjunction with other routines of the trailer backup assist system 10.

With the continued reference to FIG. 11, at step 174 the controller 28 of the trailer backup assist system 10 may generate adaptive steering angle limits 23, which according to one embodiment may be based upon the maximum hitch angle rate, the hitch angle γ, and the reversing speed of the vehicle 14. With the adaptive steering angle limits 23 generated, the trailer backup assist system 10 may control the steering angle δ of the vehicle 14 within the adaptive steering angle 23 limits to guide the trailer on a desired backing path, preventing the steering system 62 from exceeding the maximum hitch angle rate, and thereby avoid undesired hitch angle conditions outside the desired curvature 26, such as a jackknife condition The adaptive steering angle limits 23 are typically generated within the physical angle limits 20 of the steering system 62, as the steering angle δ is inherently prevented from exceeding physical angle limits 20. The adaptive steering angle limits 23 may be continuously regenerated in increments of time based on the changes to the speed of the vehicle 14 and the hitch angle γ. In one embodiment, the adaptive steering angle limits 23 may be defined with the following equations:

$$SWA_1 = \delta_1 * GR * \frac{180}{\Pi}$$

$$SWA_2 = \delta_2 * GR * \frac{180}{\Pi}$$

Where, $$\delta_1 = \tan^{-1}\left(\frac{W}{L}\left(\frac{D}{v\cos\gamma} * c - \tan\gamma\right)\right), \text{ and}$$

$$\delta_2 = \tan^{-1}\left(\frac{W}{L}\left(-\frac{D}{v\cos\gamma} * c - \tan\gamma\right)\right).$$

Figure 12:
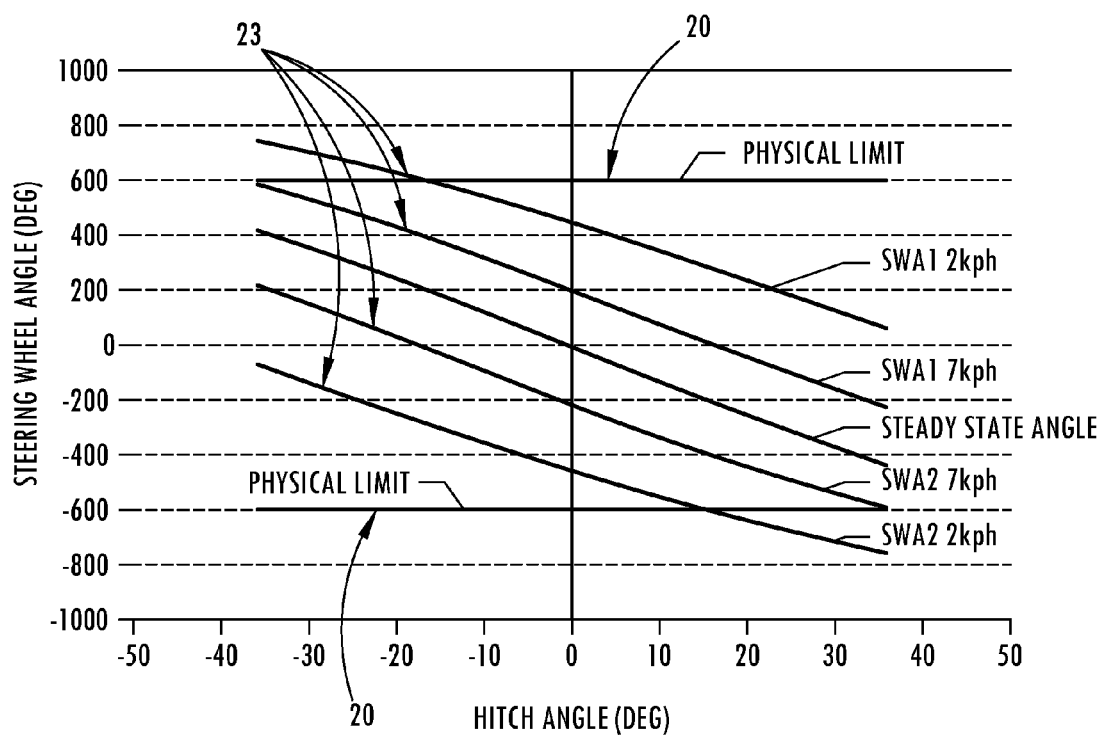
FIG. 12 is a graphical representation of the steering wheel angle relative to the hitch angle for one embodiment of a vehicle and a trailer, illustrating physical angle limits and various adaptive angle limits.

As shown in FIG. 12, the physical and adaptive steering angle limits 20, 23 are depicted for a trailer backup assist system 10 with a maximum hitch angle rate of 10 deg/s and a vehicle 14 with a wheelbase W of 3.683, a distance L from the rear axle to the hitch of 1.386, and a trailer 12 with a length D of 3.225. As shown, the adaptive steering angle limits 23 are shown for a speed of 2 kph and 7 kph.

Referring again to FIG. 11, at step 176 the controller 28 may proceed to generate a steering command based on the desired curvature 26, the sensed hitch angle γ, and the kinematic relationship. The desired steering angle of the steering command is then evaluated at step 178 to determine if it is within the physical and adaptive angle limits 20, 23. If the initially generated steering angle is outside either of the physical or adaptive angle limits 20, 23, at step 180 the most restrictive of the physical and adaptive angle limits 20, 23 that are closest to the desired steering angle will be set as the steering command. The combination of steps 178 and 180 generate a steering command within the physical and adaptive angle limits 20, 23 that guides the trailer 12 toward the desired curvature 26 and prevents the hitch angle γ from approaching a jackknife condition. More specifically, the adaptive angle limits 23 prevent the jackknife condition by only allowing the trailer 12 to be on the desired curvature 26 when the hitch angle rate is below the maximum rate determined or otherwise selected. This allows the steering angle δ to adjust with changes to the hitch angle γ, such that the rate of change of the hitch angle γ, i.e. the hitch angle rate, slows and eventually reaches zero as the vehicle 14 and the trailer 12 reach the steady state condition for the desired curvature 26, not overshooting the desired curvature 26. Further, generating the steering command within the physical and adaptive angle limits 20, 23 allows the vehicle to operate at higher speeds, while still maintaining the same hitch angle rate limits as those achieved at lower speeds. With the generated steering command, the steering angle limitation routine 130 directs at step 182 for the controller 28 to proceed with the operating routine 132.

As shown in the embodiment depicted in FIG. 10, at step 166, the steering commands are executed to guide the trailer 12 on the desired curvature 26 provided by the steering input device 18. In addition to adjusting the steering angle δ, it is contemplated that additional embodiments of the operating routine 132 may employ the braking system 72 of the vehicle 14 to autonomously limit the speed of the vehicle 14 to aid in reducing the hitch angle rate. It is also contemplated that additional embodiments may limit the speed and acceleration of the vehicle 14 and trailer 12 with other systems, such as the vehicle powertrain system 74 and/or a trailer braking system, if available.

Referring again to FIG. 12, the operational possibilities of an exemplary embodiment of the steering angle limitation routine 130 is depicted with the steering angle δ shown as the corresponding steering wheel angle. As shown, the physical steering angle limits 20 are constant for the steering system 62 of the vehicle 14 at a static steering angle defined by the operational constraints of the steering system. In contrast to the physical steering angle limits 20, the adaptive steering angle limits 23 are shown as substantially linear functions having a negative slope for the adaptive steering angle limits 23 across the potential hitch angles at two different vehicle speeds, 2 kph and 7 kph. As such, the adaptive steering angle limits 23 can been seen to decrease and further limit the potential steering angle as the hitch angle γ increases in both positive and negative directions away from the zero hitch angle. These adaptive steering angle limits 23 prevent the steering wheel angle from creating a hitch angle rate that cannot be recovered by the steering system. In some embodiments, the steering system is controllable below a threshold rate, such as a controllable steering angle rate between 300 to 600 degrees per second, that is configured to control a corresponding hitch angle rate, which may also be dependent upon the specific geometry of the trailer 12 and thereby the kinematic relationship with the vehicle 14. However, the adaptive steering angle limits 23 are greater than the physical steering angle limits 20 in the steering direction toward the zero hitch angle as the hitch angle γ increases beyond approximately 15 degrees in the illustrated embodiment. It is contemplated that in additional embodiments the physical and adaptive steering angle limits 20, 23 may be non-linear functions and alternatively configured from those illustrated herein.

In parallel with performing the operations for receiving the trailer backup assist requests, determining the desired curvature 26 of the trailer 12, and generating the vehicle steering commands, the trailer backup assist system 10 may perform an operation for monitoring if an unacceptable trailer backup condition exists. Examples of such monitoring include, but are not limited to assessing a hitch angle γ to determine if a hitch angle γ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more wheel speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to operation for ending the current trailer backup assist instance. In conjunction with performing the operation for ending the current trailer backup assist instance, an operation can be performed for controlling movement of the vehicle 14 to correct or limit a jackknife condition (e.g., steering the vehicle 14, decelerating the vehicle 14, limiting magnitude and/or rate of driver requested trailer curvature input, limiting magnitude and/or rate of the steering command, and/or the like to preclude the hitch angle from being exceeded).

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A trailer backup assist system, comprising:
a sensor measuring a hitch angle between a vehicle and a trailer;
a steering system controlling a steering angle of the vehicle between physical angle limits; and
a controller generating adaptive angle limits from a substantially linear function based on a hitch angle rate and generating a steering command based on a most restrictive of the physical and adaptive angle limits for the vehicle to guide the trailer on a desired curvature.

2. The trailer backup assist system of claim 1, wherein the adaptive angle limits are generated based on the maximum hitch angle rate, the hitch angle, and a reversing speed of the vehicle.

3. The trailer backup assist system of claim 1, wherein the maximum hitch angle rate is preset based on a controllable steering angle rate of the vehicle.

4. The trailer backup assist system of claim 1, wherein the adaptive angle limits are within the physical angle limits of the steering system.

5. The trailer backup assist system of claim 1, further comprising:
a speed sensor sensing a speed of the vehicle, wherein the maximum hitch angle rate is continuously regenerated based on the speed of the vehicle.

6. The trailer backup assist system of claim 1, wherein the adaptive steering angle limits prevent the steering angle from creating a hitch angle rate that cannot be recovered by the steering system.

7. The trailer backup assist system of claim 1, further comprising:
a secondary steering input device in the vehicle providing the desired curvature of the trailer attached to the vehicle.

8. The trailer backup assist system of claim 1, further comprising:
a vision-based hitch angle sensor measuring the hitch angle, wherein the adaptive angle limits are continuously regenerated based on a speed of the vehicle and the hitch angle.

9. A trailer backup assist system, comprising:
a hitch angle sensor sensing a hitch angle between a vehicle and a trailer;
a speed sensor sensing a speed of the vehicle;
a steering system controlling a steering angle of the vehicle; and
a controller generating an adaptive limit of the steering angle defining a substantially linear function based on a maximum hitch angle rate.

10. The trailer backup assist system of claim 9, wherein the controller generates a steering command within the adaptive limit of the steering angle for the vehicle to guide the trailer on a desired curvature.

11. The trailer backup assist system of claim 10, wherein the steering command is generated to prevent the hitch angle from approaching a jackknife condition.

12. The trailer backup assist system of claim 9, wherein the steering system is prevented from adjusting the steering angle beyond physical angle limits, and wherein the adaptive limit of the steering angle is within the physical angle limits.

13. The trailer backup assist system of claim 9, wherein the maximum hitch angle rate is preset based on a controllable rate of adjusting the steering angle the vehicle.

14. The trailer backup assist system of claim 9, wherein the maximum hitch angle rate is continuously regenerated based on the speed of the vehicle.

15. The trailer backup assist system of claim 9, wherein the adaptive steering angle limits prevent the steering angle from creating an unrecoverable hitch angle rate.

16. The trailer backup assist system of claim 9, wherein the hitch angle sensor includes a camera on the vehicle that monitors the trailer to measure the hitch angle.

17. The trailer backup assist system of claim 9, further comprising:
  a steering input device providing a desired curvature of the trailer, wherein the controller generates a steering command within the adaptive limit of the steering angle and based on a kinematic relationship of the vehicle and the trailer to guide the trailer on the desired curvature.

18. A method, comprising:
  sensing a hitch angle between a vehicle and a trailer;
  sensing a speed of the vehicle;
  generating adaptive steering angle limits for the vehicle based on a maximum hitch angle rate, the speed, and the hitch angle within physical angle limits; and
  setting a steering angle of the vehicle to the physical steering angle limit if a desired steering angle is outside of the physical limits.

19. The method of claim 18, wherein the steering angle of the vehicle is set to the physical and adaptive steering angle closest to a desired steering angle when the desired steering angle is within the physical limits.

20. The method of claim 18, further comprising:
  generating a steering command within the physical and adaptive angle limits for the vehicle to guide the trailer on a desired curvature.

\* \* \* \* \*